United States Patent Office 3,437,172
Patented Apr. 8, 1969

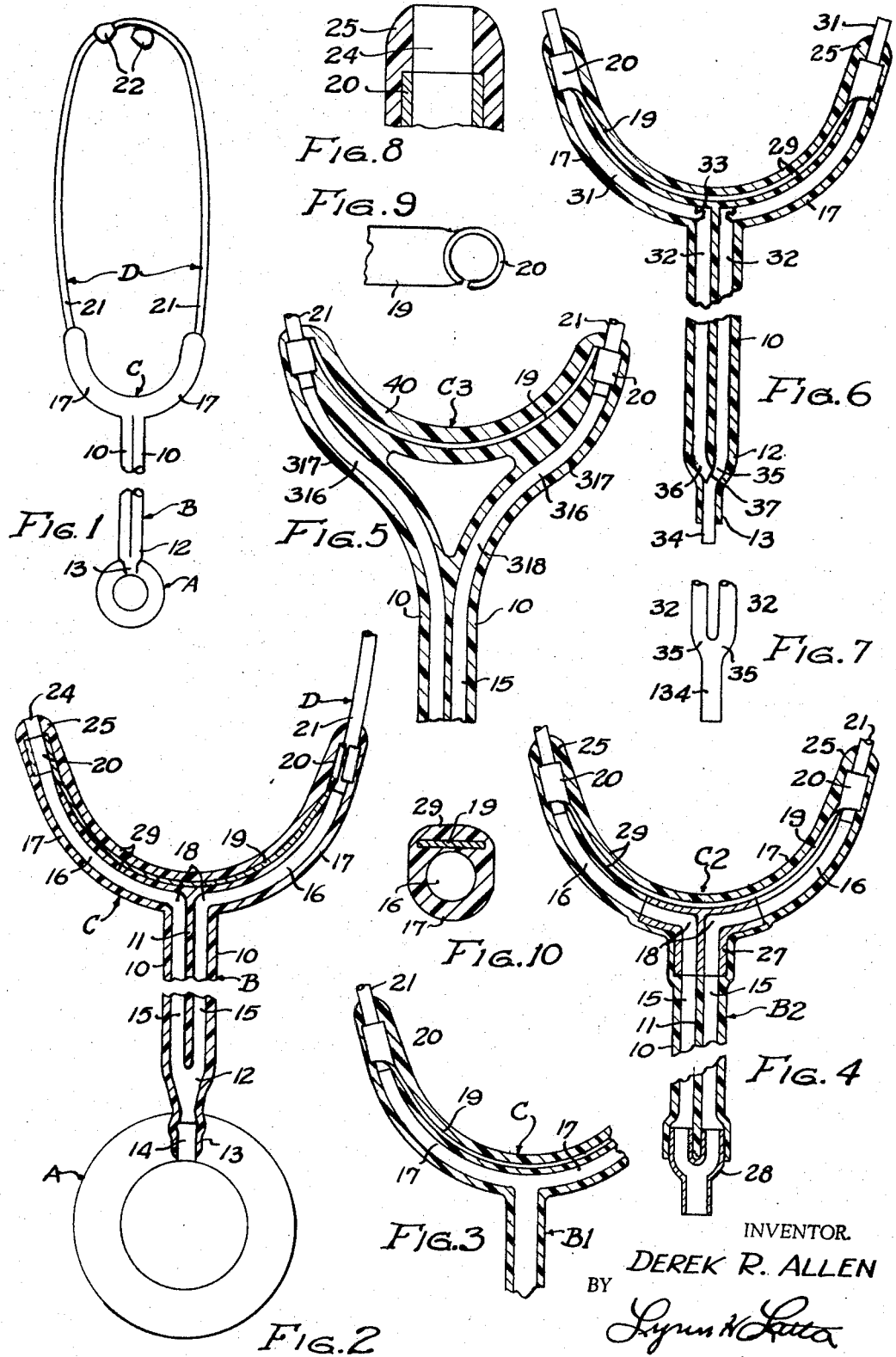

3,437,172
STETHOSCOPE WITH BINAURAL SPRING MOLDED INTO TUBING WALL AND METHOD OF FABRICATING THE SAME
Derek R. Allen, Glendale, Calif., assignor to Daimler-Benz Aktiengesellschaft, Stuttgart-Unterturkheim, Germany
Filed May 8, 1967, Ser. No. 636,777
Int. Cl. A61b 7/02; B29f 1/10; B29d 3/00
U.S. Cl. 181—24                                                9 Claims

ABSTRACT OF THE DISCLOSURE

Disclosed herein is a stethoscope binaural Y-coupling of plastic tubing with binaural coupling spring molded into the tubing wall in a manner avoiding any obstruction of coupling passage. A second feature of disclosure is a stethoscope with dual air columns extending substantially full length from microphone to binaurals, for improved transmission of higher frequencies by avoidance of mis-matched impedances which occurs in a single tube stethoscope. The dual air columns are embodied in an integral double tube.

Background of invention

Stethoscopes with springs enclosed within coupling passages, are on the market and are disclosed in Littman Patents Nos. 3,108,652; 3,152,659; 3,168,160 and 3,168,161. Stethoscopes with dual tubes extending to dual fittings on a microphone have been known and used in the past.

Summary of invention

The present invention provides a stethoscope having a completely covered binaural spring which is embedded in the tubing wall in a manner such that it does not obstruct the air passage. It has a novel and distinct advantage of being securely fixed in the binaural coupling, which greatly facilitates assembly of the binaural ear tubes to the coupling, while the flexible plastic tubing enhances the elastic memory of the spring.

The invention also provides an improved double tube structure at the point of attachment to the microphone, in that the end of the tube can be coupled to a conventional single-tube microphone having but a single fitting thereon.

Objects of the invention are to provide the novel features of improvement outlined above.

Another object is to provide a stethoscope of reduced production cost, attained by an improved method of fabrication wherein a spring is encapsulated in a plastic binaural coupling while the latter is formed by a dipping or molding process.

These and other objects will became apparent in the ensuing specification and appended drawings, wherein:

FIG. 1 is a plan view of a stethoscope embodying the invention, in the double tube form;

FIG. 2 is a fragmentary sectional view of the tubing and coupling structure thereof;

FIG. 3 is a fragmentary sectional view of a single tube stethoscope embodying the invention;

FIG. 4 is a fragmentary sectional view of a stethoscope embodying another modified form of the invention;

FIG. 5 is a fragmentary sectional view of another modified form.

FIG. 6 is a diagram illustrating a method of fabrication according to the invention.

FIG. 7 is a fragmentary view of a modified dipping mandrel construction;

FIG. 8 is an enlarged fragmentary axial sectional view of a binaural socket; and FIG. 9 is a fragmentary view of one end of the binaural junction spring.

FIG. 10 is a cross-section of the coupling tubing.

Description

Referring now to the drawing in detail, and in particular to FIG. 1 and 2, I have shown therein, as an example of one form in which the invention may be embodied, a dual-tube stethoscope comprising, in general, a microphone A, a stretch of double-column tubing B coupled to the same at one end, a Y-coupling C on the other end of tubing B; and a pair of binaurals D mounted in coupling C.

Microphone A may be of the dual convertible (bell and diaphragm) type for low and high frequencies (e.g. as disclosed in my Patent No. 3,193,047, issued July 6, 1965) or it can be a more conventional solely bell type, for low frequency sound reception, or a solely diaphragm type for high frequency sound.

Referring now to FIG. 2, tubing B (a connecting tube reaching from microphone A to coupling C) comprises, in effect, two tubes 10 joined by a common web 11, of flexible plastic material such as polyvinyl chloride or equivalent latex or other flexible plastic material. At one end, tubes 10 merge in a junction member 12, the common web 11 terminating at the beginning thereof. Junction member 12 has a terminal nipple portion 13 adapted to be coupled to a single fitting 14 of a conventional single-tube microphone.

At its other end, tubing B is integrally joined to coupling C (of the same material) comprising two arcuate tubing arms 17, the air passages 15, 15 of tubing B being continued in air passages 16, 16 of coupling arms 17, 17 connected thereto by elbow bends at 18. Encapsulated in a common upper wall of arms 17 is a binaural spring 19, having at its respective ends, integral bearing sleeves 20 which likewise are encapsulated in tubes 17 at the outer ends thereof.

Binaural ear tubes D, of metal, comprise respective stems 21 each having a respective ear knob 22 (which may be of plastic) at one end thereof, and having its other end frictionally clasped within a respective bearing sleeve 20. Bearing sleeves 20 are of split-collar type, (FIG. 9), such as are disclosed in my Patent No. 3,288,246, issued Nov. 29, 1966, and are of very slightly smaller diameter (e.g. in the range of .005"-.010" smaller) than the ear tubes D so as to hug them with a spring-clasp effect such the tubes can be rotated by application of some force and will be held in any position to which they are rotated.

Coupling tubes 17 have an upper wall 29, in the concave side of coupling C, in which spring 19 is encapsulated. Wall 29 is flattened in cross-section, as indicated in FIG. 10, its width corresponds generally to the diameter of tubing 17 (the tubing thus being generally of D-section) and its thickness is sufficient to contain the cross-section of spring 19 in fully enclosed condition, as indicated.

Being encapsulated within the plastic body of coupling C, the spring 19 is securely held against displacement along the arcuate length of arms 17 or otherwise, and it is reenforced and supported by the plastic body to the extent that its spring action is significantly enhanced by the plastic memory of arms 17. Also, being fully encapsulated, the spring need not be finished by plating or otherwise, the plastic material completely protecting its surface.

Where a spring is enclosed within the air passage of a binaural coupling, it occupies part of the area within the passage and thus partially obstructs it, and it is exposed to the oxygen and moisture of the air in the passage and hence must be plated or coated with some protective coating in order to avoid deterioration by corrosion, etc. Both of these objectionable features are avoided in the present invention. Also, the expense of plating or coating is avoided, thus substantially reducing cost of production.

Another distinct advantage of the invention is in the fact that the binaural tubes 21 can be assembled into the coupling C after the latter is completed, and during such assembly, the sleeves 20 are securely supported in the arms 17, which can be held tightly in the workman's fingers to hold the sleeves 20 steady under the pressure of the tubes 21 as the latter are forced into the sleeves 20, expanding them.

The passages 16 are of substantially the same diameter as the internal diameter of sleeves 20, and are arranged as aligned continuations of the cylindrical sockets of sleeves 20, the internal walls of passages 16 and sleeves 20 being continuations of one another. This is also true of cylindrical sockets 24 (FIG. 8) which are defined within end collars 25 which project beyond and over the outer ends of sleeves 20, in end-abutting engagement therewith, whereby the sleeves 20 are completely encapsulated within the plastic body of coupling tubes 17, and spring 19 is securely anchored against any possible relative movement between it and arms 17 when binaural stems 21 are being inserted into or removed from sleeves 20 or rotated therein. The air passages 15 and 16 are of uniformly smooth and unobstructed bore throughout, so as to provide good sound wave propagation characteristics. As will be described more fully hereinafter, this characteristic is imparted quite easily during fabrication.

Normally, the stems 21 will be inserted through the full length of sleeves 20 and beyond, so as to project into passages 16, substantially as shown. They will be snugly engaged by the internal walls of passages 16 and of sockets 24. Such engagement will supplement the spring-clasp action of sleeves 20 in securely holding the binaurals D in any selected position of rotated adjustment and in holding them against pulling out of the coupling C under normal usage conditions. On the other hand, by application of substantial pressure and pull, respectively, aided by some rotary motion, the binaurals D can be easily inserted and removed. The frictional engagement of stems 21 within the coupling C is fully adequate for holding them in assembled relation to coupling C, and no latching or fastener devices are required for this purpose.

FIG. 3 discloses a single-tube type stethoscope wherein the coupling C may be the same as in FIG. 2, and is integrally joined to the end of a single tube B1.

FIG. 4 illustrates a modified form of the invention wherein double tube B2 is fabricated separately as a cut length of extruded double-passage tubing, and coupling C2 is molded around an embedded metal or hard plastic T fitting 27 constituting a double elbow providing the two bends 18 in the air passages, and having a projecting portion to which one end of the tube B2 is attached. In the other end of tube B2 is inserted a junction fitting 28 for coupling to microphone A.

FIG. 5 illustrates another form in which the invention may be embodied, the passages 15 merging, in a modified coupling C3, in broad curves at 318, with spreading branch passages 316, the coupling C3 thus being of Y-form and the spring 19 being encapsulated in a bridge 40 joining the ends of the branch tubes 317 of the coupling.

FIG. 6 illustrates a method by which the stethoscope of FIG. 2 can be easily fabricated, and which can be readily adapted to the fabrication of the stethoscope of FIG. 3. The coupling passages 16 are shaped by a pair of arcuate mandrels 31, the ends of which project through and are firmly held in the sleeves of spring 19, while their opposite ends are temporarily attached to the ends of a pair of spaced parallel straight mandrels 32, for forming the adjacent passages 15 of tubing B. The mandrels 31, 32 may be attached together by releasable pin and socket connections 33, which function to suspend the mandrels 32 from mandrels 31 while the assembly of mandrels and spring are dipped into a plastisol which subsequently is cured or dried to form the integral tubing structure. Mandrels 32 are brought together (e.g. as illustrated) to form the junction member 12, and can be separated, unhooked from mandrels 31, and withdrawn from tubing B one at a time after the plastic tubing body is cured. Mandrels 31 can then be withdrawn from the outer ends of arms 17, being slid arcuately through sleeves 20 during the withdrawal. The end 34 of one mandrel 32 may be joined to its body by an offset 35, and the end 36 of the other mandrel 32 may be bent inwardly in symmetrical relation to offset 35 and seated in a shallow notch 37 in offset 35, from which it will be readily released upon withdrawal of the longer mandrel. Prior to and during dipping, the two mandrels 32 may be held in abutting contact (before dipping) by action of spring 19 attempting to spread to a slightly larger radius than that imposed by the mandrel assembly when coupled to the spring. The mandrels 31 are of substantially the same diameter as binaural stems 21, and sleeves 20 are slightly expanded by the insertion of the mandrels, thus gripping the mandrels with spring-clasp action so as to securely hold them in assembly with mandrels 32 preliminary to and during the dipping and curing procedure. Accordingly, after the plastic material is cured and the mandrels 31 are withdrawn, the sleeves 20 will contract slightly to a diameter smaller (e.g. by an increment within the range of approximately .005″ to .010″) than the diameters of passages 16 and sockets 24, which have been shaped by the portions of mandrels 31 projecting from opposite ends of the sleeves 20.

Alternatively, as shown in FIG. 7, where the plastic material of tubing body B is sufficiently stretchable and elastic, the mandrels 32 may be formed integrally with a stem 134 (in the form of a tuning fork) and the two mandrels may be withdrawn simultaneously through the nipple 13 by stretching the same to the width (internally) of tubing B.

A further modification of the invention, identical to the structure of FIG. 2 except that passages 16 may be embodied in a single continuous arcuate passage, open through web 11 and communicating with both of the passages 15, may be used where acoustical requirements may not be as exacting as in the uses for which the preferred form of the invention (FIG. 2) is especially adapted. Such a structure may be fabricated by using a single arcuate mandrel, its respective ends projecting through the respective sleeves 20. The mandrel may be removed through one or the other of the sleeves 20 by sliding it arcuately, after the dipping and curing steps are completed.

I claim:

1. In a stethoscope including a flexible connecting tube attachable at one end to a microphone, and including a Y-coupling at its other end, to which binaural ear tubes are attachable, the improvement characterized in that said Y-coupling comprises:
   a bowed binaural spring comprising a bow and integral bearing sleeves at the respective ends of said bow, said sleeves defining bearing sockets for reception of stems of said ear tubes;
   a tubing structure of flexible plastic material of arcuate form comprising a pair of tubing arms having a continuous wall in which said spring bow is embedded and covered on both sides thereof;
   and collar portions of said arms at the ends thereof, encasing said sleeves.

2. A stethoscope as defined in claim 1, wherein said collar portions project beyond the ends of said sleeves and have respective sockets constituting continuations of said sleeve sockets, snugly receiving said ear tube stems, and cooperating with said sleeves in holding said ear tubes in assembly and rotary adjustment with reference to said coupling.

3. A stethoscope as defined in claim 1, wherein said tubing arms are of D-section, said continuous wall being flattened with reference to the remainder of the tubing of said arms.

4. A stethoscope as defined in claim 1, wherein said connecting tube comprises two tubes providing independent air columns connected by elbow bends to respective air passages in the respective coupling arms, said two tubes being joined, side-by-side, by a common web, said web extending across to said continuous wall and integrally joined thereto so as to isolate said coupling arm air passages from one another, said coupling arms and connecting tube being embodied in an integral tubular body structure.

5. A stethoscope as defined in claim 1, wherein said connecting tube comprises two tubes providing independent air columns connected by elbow bends to respective air passages in the respective coupling arms, said two tubes being joined, side-by-side, by a common web, said coupling further including a T-fitting consisting of two elbows providing said elbow bends, said elbows being joined back-to-back along adjoining arms which communicate with respective air columns of said connecting tube, and having oppositely projecting arms embedded in the plastic body of said coupling and communicating separately with the air passages of said arms, said connecting tube comprising a length of double tubing separate from said plastic body and coupled to said adjoining arms of said T-fitting.

6. A stethoscope as defined in claim 1, wherein said coupling arms branch from said connecting tube in Y-form and wherein said coupling includes an arcuate bridge in which said spring bow is encapsulated, the ends of said bridge being integrally joined to the ends of said coupling arms.

7. A method of fabricating a stethoscope binaural coupling and double air-column connecting tube structure having a flexible plastic tubing body, comprising the following steps:

assembling a pair of generally straight mandrels in adjacent, spaced parallel arrangement with adjacent ends thereof detachably attached to a pair of arcuate mandrels branching therefrom in Y-formation;

assembling said arcuate mandrels in embracing relation to the convex side of a bowed binaural spring having at its outer ends respective ear tube socket sleeves through which the outer ends of said arcuate mandrels are projected, and utilizing said spring to hold said mandrels in assembly;

applying uncured plastic material to the external surfaces of said spring and mandrels to form an integral plastic body enclosing said spring and said mandrels for a majority of their length, said body including a double connecting tube and a pair of coupling arms; and removing said mandrels through the ends of said double tube and said coupling arms respectively, leaving said spring encapsulated in a continuous wall of said coupling.

8. The method defined in claim 7, wherein said plastic body is formed by dipping said mandrel and spring assembly into a plastisol material which will coat the surfaces of said assembly.

9. The method defined in claim 7, wherein said plastic body is formed by molding said uncured plastic material around said assembly.

References Cited
UNITED STATES PATENTS

| | | | |
|---|---|---|---|
| 1,585,407 | 5/1926 | Morin | 181—24 |
| 2,922,613 | 1/1960 | Beacham et al. | 138—177 XR |
| 3,108,652 | 10/1963 | Littmann | 181—24 |
| 3,275,099 | 9/1966 | Speelman | 181—24 |
| 3,295,631 | 1/1967 | Machlup | 181—24 |

STEPHEN J. TOMSKY, *Primary Examiner.*

U.S. Cl. X.R.

264—271

UNITED STATES PATENT OFFICE
CERTIFICATE OF CORRECTION

Patent No. 3,437,172

April 8, 1969

Derek R. Allen

It is certified that error appears in the above identified patent and that said Letters Patent are hereby corrected as shown below:

In the heading to the printed specification, lines 5 to 7, cancel "Daimler-Benz Aktiengesellschaft, Stuttgart-Unterturkheim, Germany" and insert -- Allen Medical Instrument Corporation, Montrose, Calif., a corporation of California --

Signed and sealed this 31st day of March 1970.

(SEAL)
Attest:

Edward M. Fletcher, Jr.
Attesting Officer

WILLIAM E. SCHUYLER, JR.
Commissioner of Patents